United States Patent [19]

Mangels

[11] 3,926,656
[45] Dec. 16, 1975

[54] IMPROVED FLOWMOLDING COMPOSITION

[75] Inventor: John Anthony Mangels, Allen Park, Mich.

[73] Assignee: Ford Motor Company, Dearborn, Mich.

[22] Filed: Oct. 30, 1974

[21] Appl. No.: 519,158

[52] U.S. Cl. .................................. 106/272; 106/55
[51] Int. Cl.² .................. C08L 91/06; C04B 35/58
[58] Field of Search .............. 106/272, 2, 38.25, 55; 264/63

[56] References Cited
UNITED STATES PATENTS

| | | | |
|---|---|---|---|
| 3,549,736 | 12/1970 | Waugh | 264/63 |
| 3,729,329 | 4/1973 | Morris | 264/63 |

OTHER PUBLICATIONS

Organic Binders for Ceramic Systems, Sidney Levine, *Ceramic Age*, 1960.

*Primary Examiner*—Theodore Morris
*Attorney, Agent, or Firm*—William E. Johnson; Keith L. Zerschling

[57] ABSTRACT

An improved flowmolding composition is disclosed. The composition includes a granular material, deflocculant, and a 90/10 ratio by weight mixture of a 135°F melting paraffin wax and a 195°F melting microcrystalline wax.

4 Claims, No Drawings

IMPROVED FLOWMOLDING COMPOSITION

This invention results from work carried out under Department of the Army contract number DAAG-46-71-C-0162.

BACKGROUND OF THE INVENTION

U.S. Pat. No. 3,351,688, issued Nov. 7, 1967, for Process of Casting Refractory Material teaches molding compositions which include a granular material, a deflocculant, and a wax to serve as a temporary binder. Although the patent indicates that a paraffin wax may be used as a binder for the material, the patent does not name any particular wax.

In working with the teachings of this patent, in particular with application of those teachings to the manufacture of silicon nitride articles from molding compositions containing silicon metal, it was found that the use of a single wax caused some difficulty in fabrication processes. For example, when the readily available 135°F paraffin wax was used, the article formed in the mold from the molding composition did not release well from the mold. It was also found that if the article was made from a molding composition containing 195°F microcrystalline wax, the article pulled away from the mold and cracked.

The molding of silicon metal particles is of particular interest because the particles may be nitrided in a subsequent operation to produce an article of silicon nitride. Such articles may be used in gas turbine engines to form various moving and stationary components thereof capable of withstanding high temperatures. By injection molding procedures, turbine parts can be formed of silicon metal particles by simple and reliable operations. The part is subsequently nitrided to give a final silicon nitride article. One way of improving the strength of the final article is to increase the density of the part formed in the molding operation. Since silicon metal does not undergo a volume change upon its conversion to silicon nitride in a nitriding operation, the final density becomes a simple function of the amount of silicon powder that can be loaded into the wax used as the transporting medium for the particles in a molding process. It has been found that by utilizing a particular mixture of 135°F and 195°F waxes, a greater amount of silicon may be loaded into the molding mixture thereby producing a molded part of higher density.

SUMMARY OF THE INVENTION

This invention is directed to an improved flowmolding composition and, more particularly, to an improved flowmolding composition of silicon metal powder.

The improved flowmolding composition of this invention comprises about 65–77 percent by volume of a granular material, 0.1–1.0 percent by volume of a deflocculant, and the remainder by volume of a 90/10 ratio by weight mixture of a 135°F melting wax and a 195°F melting wax. In particular, the granular material may be silicon metal powder and the deflocculant may be a zinc stearate. If the granular material is silicon metal powder, 0.1 to 2.0 percent by volume of $Fe_2O_3$ is also used.

DESCRIPTION OF THE PREFERRED EMBODIMENTS

General Process

In all cases, the ingredients for forming the improved flowmolding composition of this invention must be mixed together. To accomplish this mixing, a steam heated, double planetary mixer may be used. The waxes are placed first in the mixer and allowed to melt. The waxes are blended into a homogenous liquid. The granular material, such as silicon metal powder, is added and mixed into a uniform slurry with the wax. The deflocculant and other additives may also be added with the granular material. The mixing temperature is about 250°F. The mixture is removed from the mixer, cooled to room temperature and pulverized into small particles to fit into an injection molding machine. The degree of pulverization is not critical so long as the molding mixture may be handled by the molding machine.

The pulverized molding mixture is inserted into the cylinder of an injection molding machine. The temperatures for molding depend on the particular organic composition used as will be pointed out in greater detail in the examples below. The injection molding machine used is of the plunger type. The injection pressure employed depends on the particular waxes selected.

After a particular part has been molded, the paraffin wax binder is removed to yield a part consisting entirely of silicon metal particles. The binder is burned out by slowly heating the molded part in either air or an inert atmosphere at a rate of 7°–20°F per hour to a maximum temperature which depends on the wax employed. After burn out of the binder, the part is nitrided in a nitriding operation to produce a finished article.

EXAMPLE 1

The following materials were mixed by volume percentages to form a molding mixture: 31.1% of 135°F melting paraffin wax, 0.63% of zinc stearate, 67.3% of silicon metal powder, and 0.9% of $Fe_2O_3$ powder. After being processed in accordance with the procedure described above to form a molding mixture, the mixture was molded at a temperature of 165°F with a molding pressure of 600 psi. The resulting part was heated in air by heating the part at a rate of 7°F per hour to a final temperature of 550°F. When the part was nitrided, it produced a final article of silicon nitride having a density of about 2.45g/cc and a strength of about 32,500 psi.

This molded part formed in this manner did not release well from the mold of the injection molding machine.

EXAMPLE 2

In the same manner as Example 1, and once again on a volume percentage basis, 29.5% of 135°F melting paraffin wax, 0.60% of zinc stearate, 68.8% of silicon metal powder, and 1.0% of $Fe_2O_3$ powder was mixed to form a molding mixture. This mixture was molded at a temperature of 170°F with a molding pressure of 1500 psi. The burn out of the molded part was accomplished in the same manner as Example 1. The article produced upon nitriding of the molded part had a density of about 2.55g/cc and a strength of about 38,000 psi.

EXAMPLE 3

In the same manner as Example 1, and once again on a volume percentage basis, 21.5% of 195°F paraffin melting wax, 0.6% of zinc stearate, 68.8% of silicon metal powder, and 1.0% of $Fe_2O_3$ powder was mixed to form a molding mixture. This mixture was not acceptable for use in a molding machine because the part molded had an uncontrollable shrinkage which caused it to crack.

EXAMPLE 4

A mixture was made with the following volume percentage in accordance with the procedure of Example 1: 26.6% of 135°F melting paraffin wax, 2.9% of 195°F melting wax, 0.6% of zinc stearate, 68.8% of silicon metal powder, and 1.0% of $Fe_2O_3$ powder. This molding mixture had a 90/10 ratio by weight of the 135°-195°F melting waxes. This molding mixture was molded at a temperature of 175°F with a molding pressure of 1500 psi. The burn out of the molded part was accomplished in air at a temperature increasing at 14°F per hour to a final temperature of 900°F. The final article produced from nitriding the molded part had a density of about 2.55g/cc and a strength of about 38,000 psi.

EXAMPLE 5

A molding mixture was prepared as described in Example 1 having the following volume percentage composition: 23.9% of 135°F melting wax, 2.6% of 195°F melting wax (90/10 weight ratio of waxes), 0.54% of zinc stearate, 71.9% of silicon metal powder, and 0.9% of $Fe_2O_3$ powder.

The molding mixture was molded at a temperature of 170°F with a molding pressure of about 1500 psi. The burn out occurred in the same manner as described in Example 4. The final article produced when the molded part was nitrided had a density of about 2.65g/cc and a strength of about 43,000 psi.

EXAMPLE 6

A molding mixture was prepared as described in Example 1 having the following volume percentage composition: 20.2% of a 135°F melting wax, 2.2% of a 195°F melting was (90/10 weight ratio of waxes), 0.45% zinc stearate, 76.5% of silicon metal powder, and 0.75 $Fe_2O_3$ powder.

The molding mixture was molded at a temperature of 200°F with a molding pressure of 2000 psi. The burn out occured in the same manner as described in Example 4. The final article produced when the molded part was nitrided had a density of 2.8g/cc and a strength of 42,000 psi.

The molding composition disclosed herein in one which includes a ratio of 90/10 by weight of a 135°F melting wax to a 195°F melting wax. As is apparent from Examples 4, 5 and 6, generally higher densities and strengths are achievable with the mixed wax system than can be achieved by use of a single wax system.

In view of this specification, modifications of this invention will be apparent to those skilled in the art. It is intended that all modifications which fall within the true spirit and scope of this invention be included within the coverage of the appended claims.

I claim:

1. An improved flowmolding composition which comprises:
   65–77% by volume of a granular refractory material;
   0.1–1.0% by volume of a deflocculant;
   the remainder of volume being a 90/10 ratio by weight mixture of a 135°F melting paraffin wax and a 195°F microcrystalline wax.

2. The molding composition of claim 1 wherein: said granular material is silicon metal powder.

3. The molding composition of claim 2 wherein: the composition also includes 0.1–2.0% by volume of $Fe_2O_3$.

4. The molding composition of claim 1 wherein: said deflocculant is zinc stearate.

* * * * *